US012233645B2

(12) United States Patent
Martin et al.

(10) Patent No.: US 12,233,645 B2
(45) Date of Patent: Feb. 25, 2025

(54) FLUIDIC DIE HAVING TRICKLE-WARMING AND PULSE-WARMING CIRCUITS

(71) Applicant: Hewlett-Packard Development Company, L.P., Spring, TX (US)

(72) Inventors: Eric Thomas Martin, Corvallis, OR (US); Garrett E. Clark, Corvallis, OR (US); Jeremy Spencer, Corvallis, OR (US); Vincent C. Korthuis, Corvallis, OR (US); Rogelio Cicili, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 153 days.

(21) Appl. No.: 18/018,253

(22) PCT Filed: Jul. 31, 2020

(86) PCT No.: PCT/US2020/044429
§ 371 (c)(1),
(2) Date: Jan. 26, 2023

(87) PCT Pub. No.: WO2022/025915
PCT Pub. Date: Feb. 3, 2022

(65) Prior Publication Data

US 2023/0286262 A1 Sep. 14, 2023

(51) Int. Cl.
*B41J 2/045* (2006.01)

(52) U.S. Cl.
CPC ......... *B41J 2/04541* (2013.01); *B41J 2/0458* (2013.01)

(58) Field of Classification Search
CPC ............................ B41J 2/04541; B41J 2/0458
See application file for complete search history.

(56) References Cited

U.S. PATENT DOCUMENTS 6,231,154 B1 5/2001 Corrigan
6,476,928 B1 11/2002 Barbour et al.
6,669,317 B2 12/2003 Linder et al.
7,341,324 B2 3/2008 Juve et al.
8,388,085 B2 3/2013 Linn
2002/0149639 A1* 10/2002 Crivelli .................. B41J 2/0458 347/17
2003/0081034 A1 5/2003 Bauer
2003/0142159 A1* 7/2003 Askeland ............. B41J 2/04591 347/14
2004/0032464 A1* 2/2004 Gonzalez ............. B41J 2/04533 347/63
2004/0196352 A1 10/2004 Busch et al.
2006/0066655 A1 3/2006 Richard et al.
2017/0348980 A1 12/2017 Liu

* cited by examiner

*Primary Examiner* — Sharon Polk
(74) *Attorney, Agent, or Firm* — Foley & Lardner LLP

(57) ABSTRACT

A fluidic die includes fluid-transfer elements, and a temperature sensor to monitor a temperature on the fluidic die. The fluidic die includes a trickle-warming circuit to warm fluid transferrable by the fluid-transfer elements, and a pulse-warming circuit to warm the fluid. A warming control circuit selectively activates the trickle-warming and pulse-warming circuits.

15 Claims, 10 Drawing Sheets

FLUIDIC DIE HAVING TRICKLE-WARMING AND PULSE-WARMING CIRCUITS

CROSS-REFERENCE TO RELATED APPLICATIONS

This application is filed under 35 U.S.C. § 371 as a National Stage of PCT International Application No. PCT/US2020/044429, filed Jul. 31, 2020, which is incorporated by reference herein in its entirety.

BACKGROUND

Printing devices, including industrial digital press printers as well as smaller enterprise, workgroup, and desktop standalone printers and all-in-one (AIO) printing devices, can use a variety of different printing techniques. One type of printing technology is inkjet-printing technology, which is more generally a type of fluid-ejection technology. A fluid-ejection system, such as a printhead cartridge or a printing device having such a cartridge, includes a number of fluid-ejection elements with respective nozzles disposed on a fluidic die. Firing a fluid-ejection element causes the element to eject fluid, such as a drop thereof, from its nozzle.

DETAILED DESCRIPTION

Figure 1A:
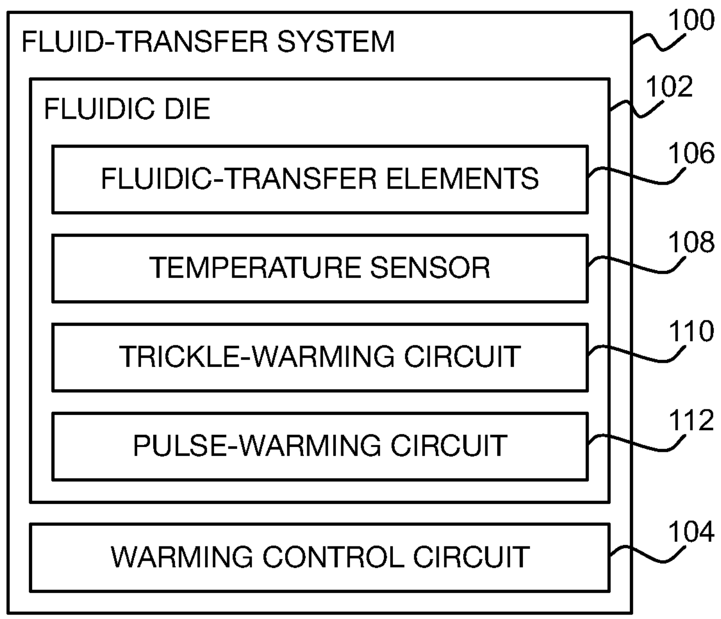
FIGS. 1A and 1B are block diagrams of example fluid-transfer systems having fluidic dies with both trickle-warming and pulse-warming circuits.

As noted in the background, firing a fluid-ejection element of a fluid-ejection device causes the element to eject fluid. To improve fluid-ejection performance as well as fluid-ejection quality, such as the quality of an image formed by ejected fluid in the case of an inkjet-printing device, fluid-ejection systems may employ warming circuits on their fluidic dies. A warming circuit warms the fluid in the die prior to or during ejection.

One type of warming circuit is referred to as a pulse-warming circuit. A pulse-warming circuit leverages a fluid-transfer element's firing element, such as a firing resistor like a thermal resistor, to warm fluid prior to ejection. Ordinarily a firing element is activated by application of a pulse of a specified length to energize the firing element of the fluid-ejection element for a length of time to impart sufficient energy to eject fluid from the fluid-ejection element. A pulse-warming circuit applies a shorter pulse in length, which energizes the firing element for a length of time sufficient to warm the fluid without imparting sufficient energy to eject the fluid from the fluid-ejection element.

A pulse-warming circuit can be integrated within a fluidic die with minimal spatial increase, since dedicated warming elements such as thermal resistors and/or transistors do not have to be provided. However, pulse warming can impair image quality in certain types of fluid-ejection systems. For example, in one type of fluid-ejection system, fluid is continuously recirculated throughout the chambers of the fluid-ejection elements to cool the fluidic die. Fluidic dies permitting continuous fluid recirculation may be referred to as full system recirculation (FSR) dies. Pulse warming may occur at a higher duty cycle in such dies, adversely affecting attributes of the ejected drops of fluid and thus image quality.

Another type of warming circuit is referred to as a trickle-warming circuit. A trickle-warming circuit may have its own warming element, such as its own thermal resistor, or may instead leverage a fluid-ejection element's firing element. A trickle-warming circuit warms the fluid by applying lower instantaneous power to its warming element (either a dedicated warming element or a fluid-ejection element's firing element) than is applied to a firing element to eject fluid. If the trickle-warming circuit has its own warming element, the warming element may be smaller in size (e.g., lower in power) than a fluid-ejection element's firing element. If the trickle-warming circuit leverages a fluid-ejection element's firing element, the circuit may cause less current to instantaneously flow through the firing element to impart insufficient energy to eject the fluid from the fluid-ejection element.

Trickle-warming circuits may not impair image quality in certain types of fluid-ejection systems the way pulse warming may. If a trickle-warming circuit has its own warming element, warming can occur asynchronously with fluid ejection, in that the warming element may be energized while a fluid-ejection element's firing element is energized. However, this can result in greater peak power usage and a correspondingly larger power supply, since at any given time both firing elements and warming elements may be energized. Furthermore, space has to be provided on a fluidic die for the dedicated warming elements, which may increase die size. Trickle warming may also be less efficient at warming the fluid when spatially located away from the fluid-ejection elements on the fluidic die.

Techniques described herein improve fluid warming within fluid-ejection and other fluid-transfer systems by providing for both pulse-warming circuits and trickle-warming circuits on their fluidic dies. A warming control circuit can selectively activate either or both of the two different types of warming circuits to leverage each depending on the current situation. As one example, at initiation of a fluid-ejection or other fluid-transfer job, both pulse- and trickle-warming circuits may be activated to quickly warm the fluid. Once a monitored temperature on the fluidic die has reached a threshold temperature, just the trickle-warming circuit may be activated at commencement of the job, to maintain the monitored temperature at the threshold temperature until the job has been completed.

Figure 1B:
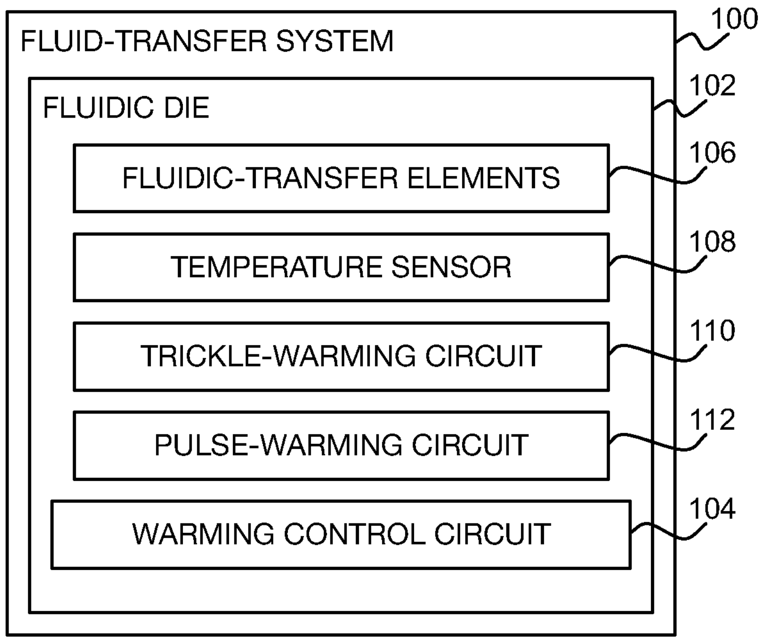

FIGS. 1A and 1B show different examples of a fluid-transfer system 100. The fluid-ejection system 100 includes a fluidic die 102 and a warming control circuit 104. The fluid-transfer system 100 may transfer fluid in that the system 100 moves, or transfer, fluid from one part of the fluidic die 102 to another part of the die 102 for mixing and other purposes. For example, the fluidic die 102 may be a microfluidic device employed for medical testing or other types of diagnostic testing, in which a fluid sample is transferred among different parts of the die 102 to isolate constituent components of the sample.

The fluid-transfer system 100 may instead transfer fluid in that system 100 ejects, or transfers, fluid from the die 102, in which case the system 100 is a fluid-ejection system. Examples of fluid-ejection systems include fluid-ejection devices, such as industrial digital press printers as well as enterprise, workgroup, and desktop printers and all-in-one (AIO) printing devices. Other examples include fluid-ejection systems that eject pharmaceutical and other fluids for drug manufacture.

Fluid-ejection systems may be two-dimensional (2D) systems that eject fluid, like ink, to form images on media, such as paper. Fluid-ejection systems may be three-dimensional (3D) systems that create physical objects over three dimensions by successively ejecting thin layers of fluidic print material. A fluid-ejection system may be or include a fluid-ejection printhead cartridge that may or may not include a fluid supply, and which is part of, installable within, or connectable to a fluid-ejection device.

The fluid-transfer system 100 may include more than one fluidic die 102, each having a corresponding warming control circuit 104. In FIG. 1A, the warming control circuit 104 is not part of the die 102. For example, the warming control circuit 104 may be disposed on a logic board of a fluid-ejection printhead cartridge including the die 102, or on a logic board of a fluid-ejection device including the die 102. In FIG. 1B, by comparison, the warming control circuit 104 is part of the die 102.

The fluidic die 102 includes fluid-transfer elements 106, a temperature sensor 108, and a trickle-warming circuit 110 and a pulse-warming circuit 112 to warm fluid within the die 102. Each fluid-transfer element 106 can transfer fluid, such as eject fluid therefrom (in which case each fluid-transfer element 106 is a fluid-ejection element). The fluid-transfer elements 106 may be organized in groups that can be referred to as primitives. The temperature sensor 108 monitors a temperature on the die 102. For example, the temperature sensor 108 may monitor the temperature of an area of the die 102, and thus indirectly may monitor the temperature of the fluid transferrable by the fluid-transfer elements 106 within this area.

There may be one temperature sensor 108, one trickle-warming circuit 110, and one pulse-warming circuit 112 for each primitive of fluid-transfer elements 106, or there may be one sensor 108 and one of each warming circuit 110 and 112 for sets of the primitives, where different sets of primitives may correspond to different warming zones. For example, there may be multiple warming zones that each include multiple primitives of fluid-transfer elements 106, a temperature sensor 108, a trickle-warming circuit 110, and a pulse-warming circuit 112. As another example, there may be trickle-warming zones that each include a trickle-warming circuit 110 and pulse-warming zones that each include a pulse-warming circuit 112, where there may be more or fewer trickle-warming zones than pulse-warming zones. In this case, there may be a temperature sensor 108 for each pulse-warming and/or trickle-warming zone.

The warming control circuit 104 may be implemented as an application-specific integrated circuit (ASIC) or in another manner. The warming control circuit 104 selectively activates the trickle-warming and pulse-warming circuits 110 and 112. For example, the warming control circuit 104 may selectively activate the warming circuits 110 and 112 to warm and then maintain the temperature monitored by the temperature sensor 108 to a threshold temperature.

Figure 2A:
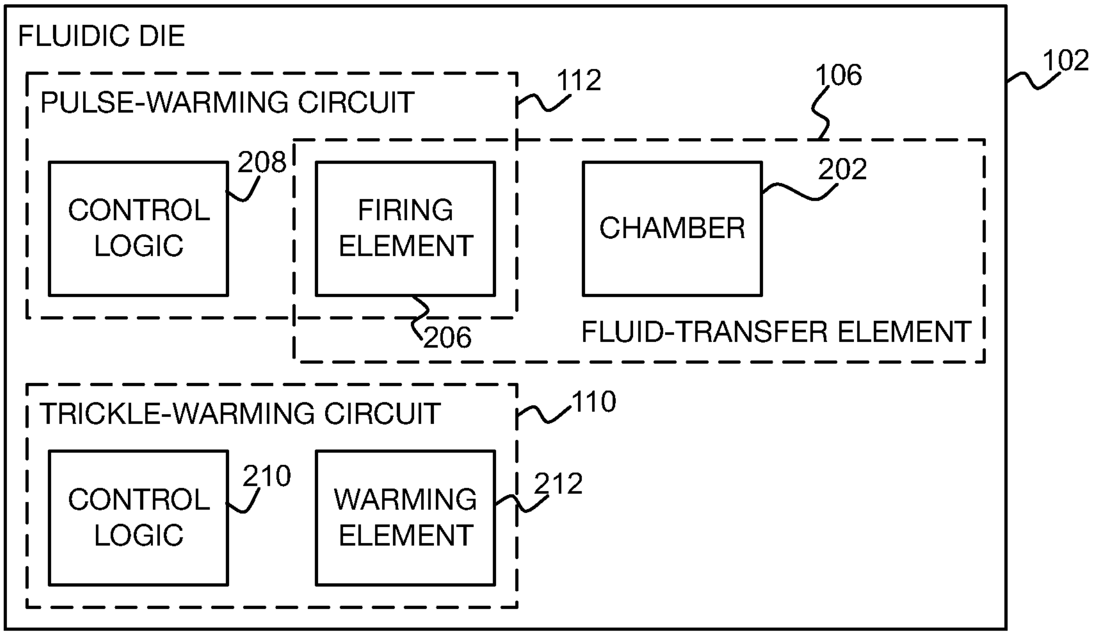
FIGS. 2A and 2B are block diagrams of example fluidic dies having both trickle-warming and pulse-warming circuits.
Figure 2B:
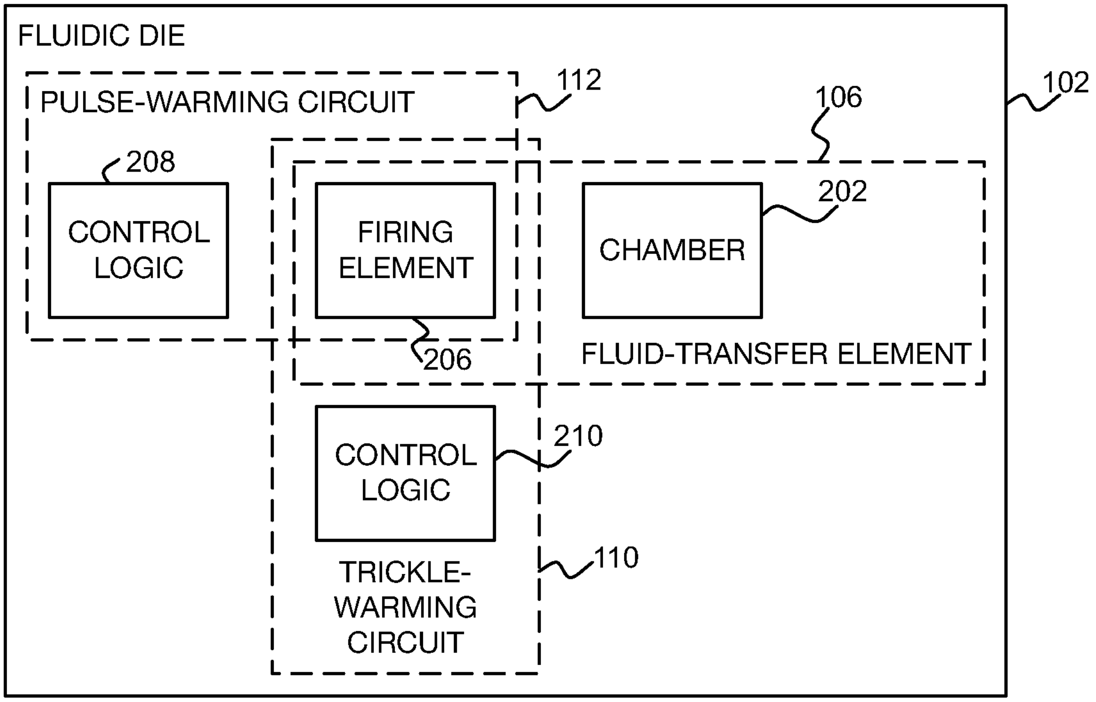

FIGS. 2A and 2B show different examples of the fluidic die 102 in detail. Each fluid-transfer element 106 includes a fluidic chamber 202 and a firing element 206. The firing element 206, which may be a thermal resistor, can be energized or otherwise actuated to transfer fluid within the chamber 202. For example, in the case of a fluid-transfer element 106 that is a fluid-ejection element, energizing the firing element 206 ejects fluid from the chamber 202 and from the die 102, such as through a nozzle or office. In the case of a fluid-transfer element 106 that is not a fluid-ejection element, such as a microfluidic pump, energizing the firing element moves fluid from the chamber 202 to a different part of the die 102, such as for isolation or mixing purposes.

The pulse-warming circuit 112 leverages the firing element 206 of each fluid-transfer element 106 as its warming element, and further includes control logic 208. The control logic 208 may be implemented as an ASIC or on the fluidic die 102. The trickle-warming circuit 110 similarly has control logic 210 that may be implemented as an ASIC or on the fluidic die 102. In FIG. 2A, the trickle-warming circuit 110 has its own warming element 212, such as one or multiple thermal resistors, separate from the firing element 206 of each fluid-transfer element 106. In FIG. 2B, by comparison, the trickle-warming circuit 110 leverages the firing element 206 of each fluid-transfer element 106 as its warming element.

Figure 3A:
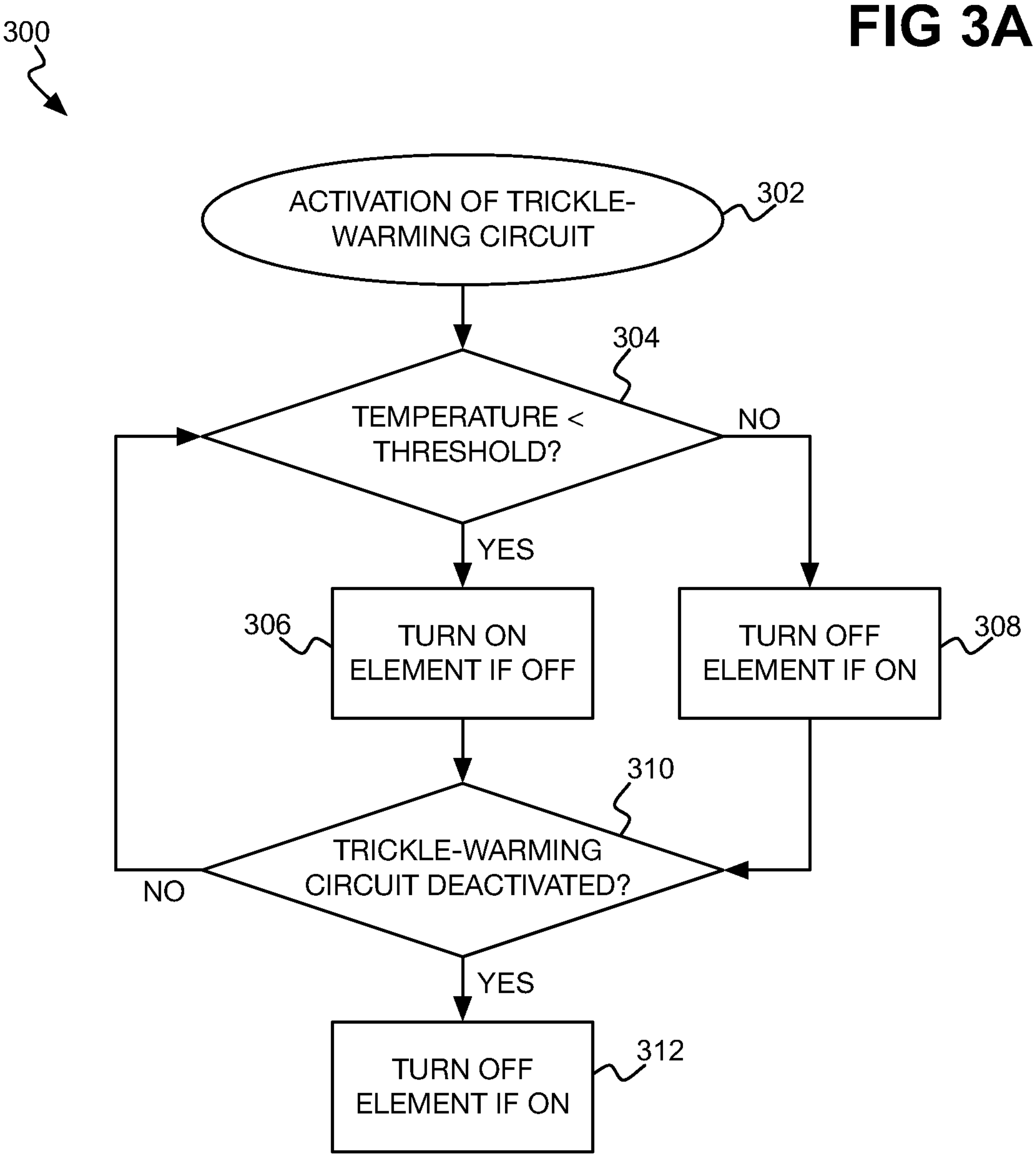
FIGS. 3A and 3B are flowcharts of example methods for trickle warming and pulse warming, respectively.

FIG. 3A shows an example method 300 for trickle warming fluid within the fluidic die 102. The trickle-warming circuit 110 performs the method 300 when activated, such as by the warming control circuit 104 at initiation or commencement of or during a fluid-transfer job. The method 300 may be implemented as a non-transitory computer-readable data storage medium storing program code executable by a processor. For example, the data storage medium and the processor may be integrated as an ASIC in the case in which the control logic 210 of the trickle-warming circuit 110 is an ASIC.

At activation of the trickle-warming circuit 110 (302), the circuit 110 determines whether the monitored temperature is less than a threshold temperature (304). For example, the trickle-warming circuit 110 may receive the monitored temperature from the temperature sensor 108. If the monitored temperature is less than the threshold temperature, the trickle-warming circuit 110 turns on (e.g., energizes) its warming element if off (306), whereas if the monitored temperature is greater than the threshold temperature, the circuit 110 turns off (e.g., deenergizes) its warming element (308).

In the case in which the trickle-warming circuit 110 has its own warming element 212 as in FIG. 2A, the warming element 212 transfers less instantaneous power to the fluid than the firing element 206 of the fluid-transfer element 106 can. In the case in which the trickle-warming circuit 110 leverages the firing element 206 as its own warming element, the circuit 110 controls the firing element 206 in such a way to warm the fluid without causing fluidic transfer (e.g., ejection). For example, the trickle-warming circuit 110 may energize or otherwise actuate the firing element 206 at lower instantaneous power (i.e., at insufficient power) than when fluid ejection or other transfer is to occur.

The trickle-warming circuit 110 continues turning on and off the warming element as the monitored temperature drops below and rises above the threshold temperature, until the circuit 110 has been deactivated (310). For example, at completion of a fluid-transfer job, the warming control circuit 104 may deactivate the trickle-warming circuit 110. The trickle-warming circuit 110 responsively turns off its warming element (312).

Figure 3B:
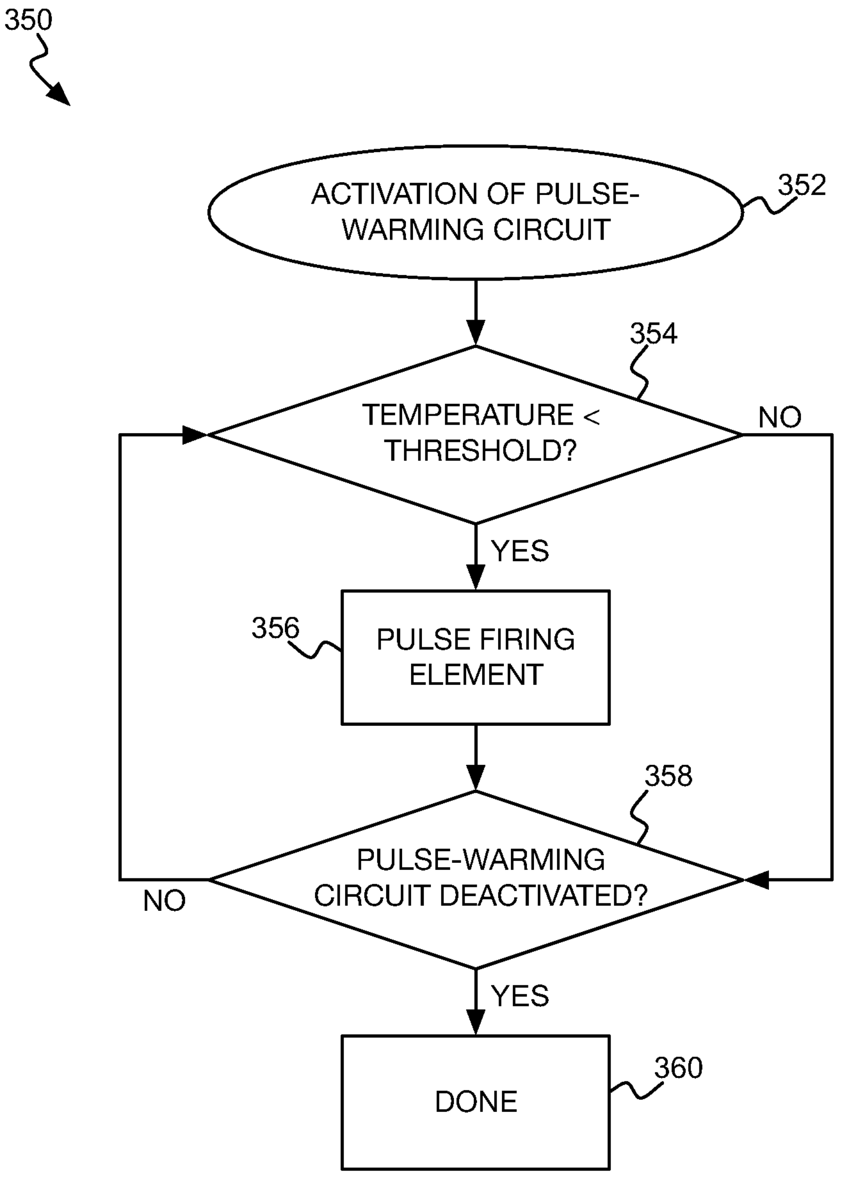

FIG. 3B shows an example method 350 for pulse warming fluid within the fluidic die 102. The pulse-warming circuit 112 performs the method 350 when activated, such as by the warming control circuit 104 at initiation or commencement of or during a fluid-transfer job. The method 350 may be implemented as a non-transitory computer-readable data storage medium storing program code executable by a processor. For example, the data storage medium and the processor may be integrated as an ASIC in the case in which the control logic 208 of the pulse-warming circuit 112 is an ASIC.

At activation of the pulse-warming circuit 112 (352), the circuit 112 determines whether the monitored temperature is less than a threshold temperature (354). For example, the pulse-warming circuit 112 may receive the monitored temperature from the temperature sensor 108. If the monitored temperature is less than the threshold temperature, the pulse-warming circuit 112 pulses the firing element 206 of the fluid-transfer element 106 (356). That is, the pulse-warming circuit 112 pulsatingly energizes or otherwise actuates the fluid-transfer element 106 to warm the fluid without causing transfer (e.g., ejection). For example, the pulse-warming circuit 112 may energize the firing element 206 at the same instantaneous power than when fluid transfer is to occur, but for a shorter length of time (e.g., a shorter pulse) so that fluid transfer does not occur.

The pulse-warming circuit 112 continues pulsing of the fluid-transfer element 106 as the monitored temperature drops below the threshold temperature, until the circuit 112 has been deactivated (358). For example, at initiation of a fluid-transfer job, the warming control circuit 104 may activate the pulse-warming circuit 112, and then deactivate the circuit 112 once the monitored temperature has reached the threshold temperature and the job is to commence. The method 350 is then finished (360).

Figure 4:
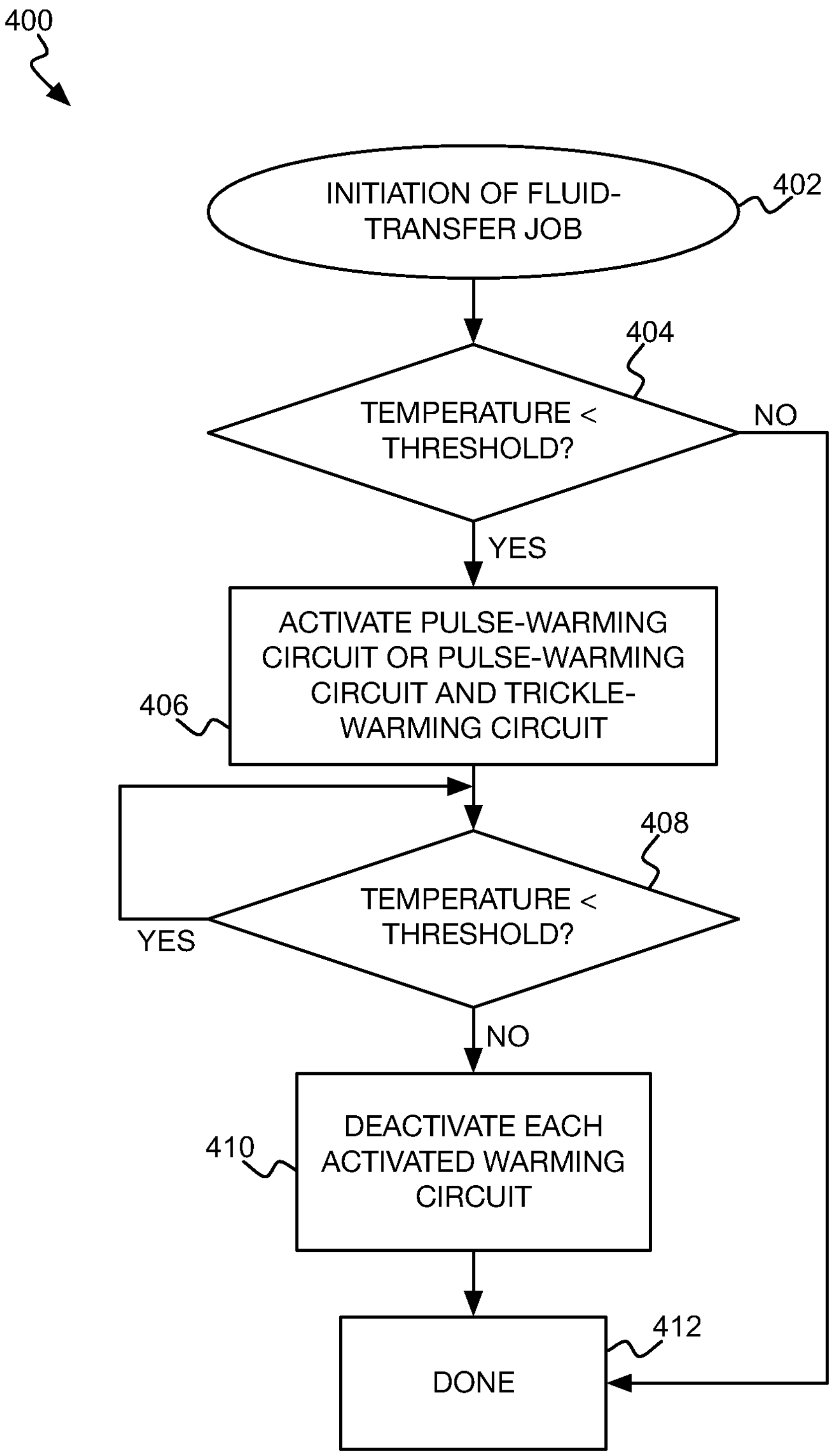
FIG. 4 is a flowchart of an example method for selectively activating trickle-warming and pulse-warming circuits at initiation of a fluid-transfer job, prior to commencement of the job.

FIG. 4 shows an example method 400 for selectively activating the trickle-warming circuit 110 and the pulse-warming circuit 112 at initiation of a fluid-transfer job, prior to the job commencing. The warming control circuit 104 performs the method 400. The method 400 may be implemented as a non-transitory computer-readable data storage medium storing program code executable by a processor. For example, the data storage medium and the processor may be integrated as an ASIC in the case in which the warming control circuit 104 is an ASIC.

A fluid-transfer job may be initiated when the job has been received, and the fluid-transfer system 100 is not currently performing another fluid-transfer job. After initiation, the fluid-transfer job then commences, which means that the fluid-transfer elements 106 are selectively actuated to transfer (e.g., eject) fluid in accordance with the job. In the case in which the fluid-transfer system 100 is an inkjet-printing system, the fluid-transfer job may be a print job having one page or multiple pages. The fluid-transfer elements 106 are actuated to form an image on each page of the print job, as specified by the job. A page as used herein can mean an image printed on a media sheet like a sheet a paper, as well as on a label or sheet of labels, a package item like a box or envelope, a textile item like an article of clothing such as a shirt, a layer of a 3D-printed object or the object as a whole, and so on.

At initiation of a fluid-transfer job (402), the warming control circuit 104 determines whether the monitored temperature is less than a threshold temperature (404). For example, the warming control circuit 104 may receive the monitored temperature (e.g., a signal denoting this temperature) from the temperature sensor 108. If the monitored temperature is less than the threshold temperature, the warming control circuit 104 activates the pulse-warming circuit 112 in one implementation, or both the pulse-warming and trickle-warming circuits 112 and 110 in another implementation (406). The methods of FIGS. 3A and/or 3B are accordingly performed, such as with respect to the same threshold temperature against which the warming control circuit 104 compared the monitored temperature.

The warming control circuit 104 continues to determine whether the monitored temperature is less than the threshold temperature (408). Once the monitored temperature has warmed to the threshold temperature or greater, the warming control circuit 104 deactivates each warming circuit 112 and/or 110 that the circuit 104 previously activated (410). The method 400 is thus finished (412). The initiated fluid-transfer job can then commence, proceeding with selective actuation of the fluid-transfer elements 106 to transfer (e.g., eject) fluid in accordance with the job.

FIGS. 5A, 5B, 5C, and 5D respectively show example methods 500, 520, 540, and 560 for selectively activating the trickle-warming circuit 110 and the pulse-warming circuit 112 at commencement of a fluid-transfer job, after the job has been initiated. The warming control circuit 104 performs the methods 500, 520, 540, and 560. The methods 500, 520, 540, and 560 may each be implemented as a non-transitory computer-readable data storage medium storing program code executable by a processor. For example, the data storage medium and the processor may be integrated as an ASIC in the case in which the warming control circuit 104 is an ASIC.

The methods 500, 520, 540, and 560 can be performed after the method of FIG. 4 has been performed. The methods 500, 520, 540, and 560 are performed as or while the fluid-transfer elements 106 are selectively actuated to transfer (e.g., eject) fluid in accordance with the fluid-transfer job that has been commenced. The method 500, 520, 540, and 560 may be combined with any other method(s) 500, 520, 540, and 560 in one implementation.

Figure 5A:
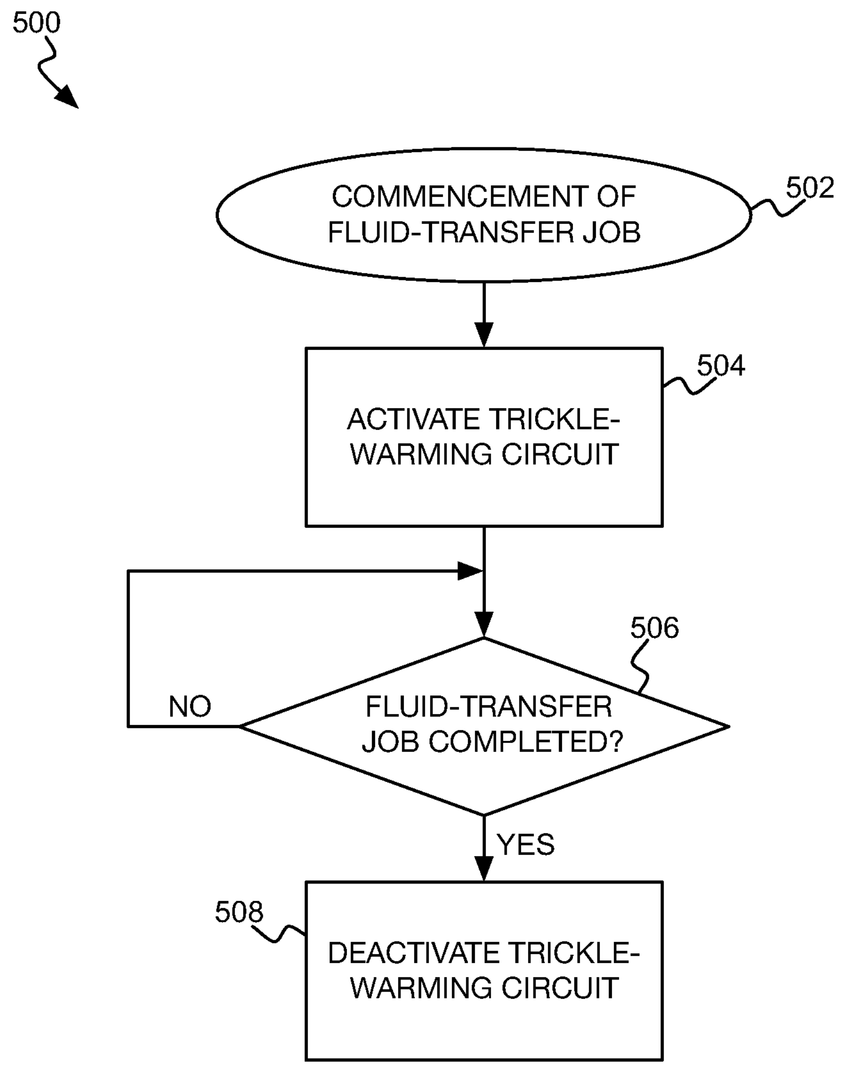
FIGS. 5A, 5B, 5C, and 5D are flowcharts of example methods for selectively activating trickle-warming and pulse-warming circuits at commencement of a fluid-transfer job, subsequent to initiation of the job.

In the method 500 of FIG. 5A, at commencement of a fluid-transfer job, the warming control circuit 104 activates the trickle-warming circuit 110 (504). The method of FIG. 3A is accordingly performed. Once the fluid-transfer job has been completed (506), the warming control circuit 104 deactivates the trickle-warming circuit 110 (508). For example, in the case in which the fluid-transfer system 100 is an inkjet-printing system, every page of the print job will have been printed at job completion. The described method 500 thus uses just the trickle-warming circuit 110, and not the pulse-warming control circuit 112, to warm the fluid within the fluidic die 102 while the fluid-transfer job is being performed, which can prevent contention of the firing elements 206 of the fluid-transfer elements 106 for both fluid-transfer (e.g., ejection) and fluid-warming purposes.

Figure 5B:
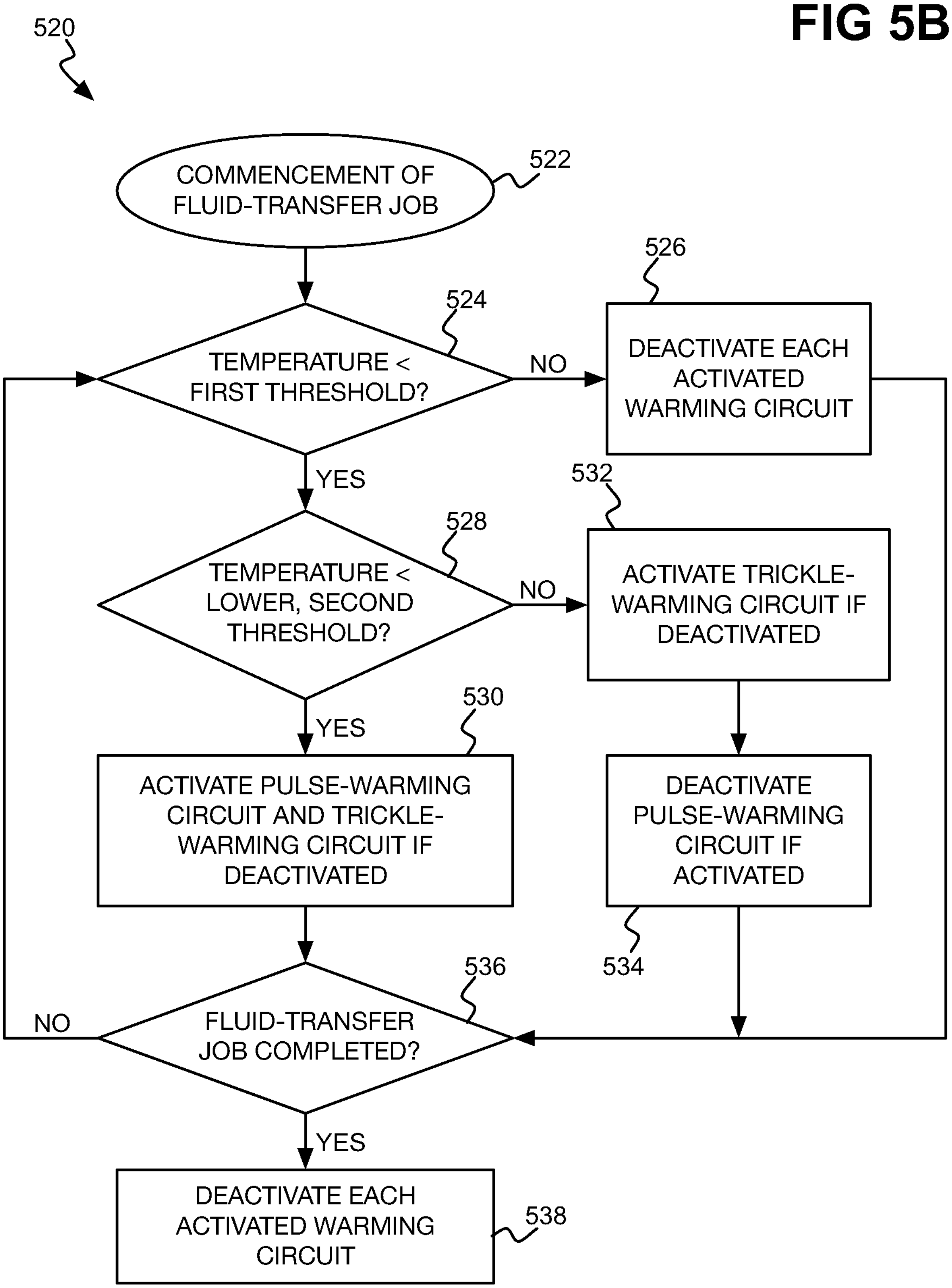

In the method 520 of FIG. 5B, at commencement of a fluid-transfer job, the warming control circuit 104 determines whether the monitored within the fluidic die 102 is less than a first threshold temperature (524). For example, the warming control circuit 104 may receive the monitored temperature from the temperature sensor 108. If the monitored temperature is less than the first threshold temperature, then the warming control circuit 104 deactivates each warming circuit 110 and/or 112 that is activated (526).

If the monitored temperature is less than the first threshold temperature, however, the warming control circuit 104 determines whether the monitored temperature is also less than a lower, second threshold temperature (528). If the monitored temperature is less than both the first and second threshold temperatures, then the warming control circuit 104 activates each of the pulse-warming and trickle-warming circuits 112 and 110 if deactivated (530). The methods of FIGS. 3A and 3B are accordingly performed, with respect to the second temperature threshold.

In the case of the pulse-warming circuit 112, the method of FIG. 3B may be performed as to just the fluid-transfer elements 106 that are not currently transferring (e.g., ejecting) fluid, and in one implementation that further will be transferring fluid next per the fluid-transfer job. In the case in which the trickle-warming circuit 110 does not have its own warming element 212, the method of FIG. 3A may likewise be performed as to just the fluid-transfer elements 106 that are not currently transferring (e.g., ejecting) fluid, and in one implementation that further will be transferring fluid next per the fluid-transfer job. This is because the warming circuits 110 and 112 cannot for fluid-warming purposes energize the firing elements 206 of the fluid-transfer elements 106 that are currently be energized for fluid-transfer purposes.

If the monitored temperature is less than the first threshold temperature but not less than the second threshold temperature, then the warming control circuit 104 activates just the trickle-warming circuit 110 if deactivated (532), and deactivates the pulse-warming circuit 112 if activated (534). The method of FIG. 3A is accordingly performed, with respect to either the first or second temperature threshold. If the trickle-warming circuit 110 does not have its own warming element 212, the method of FIG. 3A may be performed as to just the fluid-transfer elements 106 that are not currently transferring fluid, and in one implementation that further will be transferring fluid next per the fluid-transfer job. In another implementation, just the pulse-warming circuit 112 may be activated in part 532, with the trickle-warming circuit 110 deactivated in part 534.

The warming control circuit 104 continues selectively activating the pulse-warming and trickle-warming circuits 112 and 110 based on the monitored temperature within the fluidic die 102 in this manner, until the fluid-transfer job has been completed (536). The warming control circuit 104 responsively turns off each warming circuit 110 and/or 112 that is still activated (538). In the method 520, therefore, the pulse-warming circuit 112 assists the trickle-warming circuit 110 with fluid warming during performance of the fluid-transfer job when the fluid is too cold.

Figure 5C:
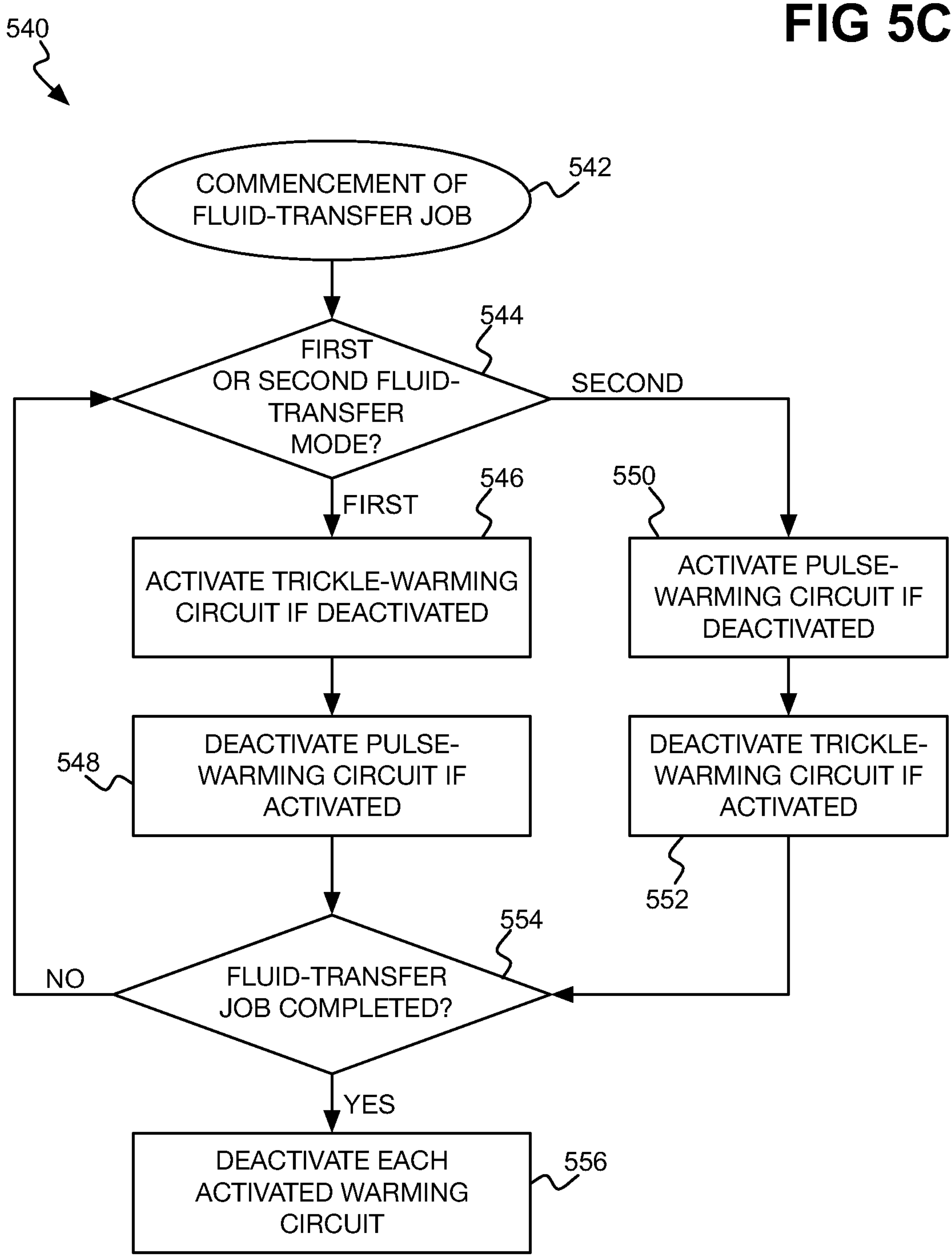

In the method 540 of FIG. 5C, at commencement of a fluid-transfer job (542), the warming control circuit 104 determines whether the fluidic (i.e., fluid-transfer) activity of the fluidic die 102 is currently in or corresponds to a first fluid-transfer mode or a second fluid-transfer mode (544). For example, the first-transfer mode may be a high-frequency mode in which the fluid-transfer elements 106 are actuated at a frequency greater than a threshold frequency, and the second-transfer mode may be a low-frequency mode in which the elements 106 are actuated at a frequency less than the threshold frequency. The frequency of actuation of the fluid-transfer elements 106 corresponds to how soon the elements 106 are actuated since their last actuation. In the case in which the fluid-transfer system 100 is an inkjet-printing system, high actuation frequency can correspond to the printing of a series of dots, short dashes, or thin vertical lines.

If the fluidic (i.e., fluid-transfer) activity of the fluidic die 102 corresponds to the first fluid-transfer mode, then the warming control circuit 104 activates just the trickle-warming circuit 110 if deactivated (546), and deactivates the pulse-warming circuit 112 if activated (548). For example, if the first-fluid transfer mode is the high-frequency mode, usage of the pulse-warming circuit 112 may impair fluid-ejection quality in the case in which the fluid-transfer system 100 is a fluid-ejection system. If the fluid-ejection system is a continuous-recirculation inkjet-printing system, the resulting printed image may exhibit a ripple effect, in which partial horizontal banding occurs. Therefore, just the trickle-warming circuit 110 is used.

If the fluidic (i.e., fluid-transfer) activity of the fluidic die 102 corresponds to the second fluid-transfer mode, then the warming control circuit 104 activates just the pulse-warming circuit 112 if deactivated (550), and deactivates the trickle-warming circuit 110 if activated (552). In the case in which the fluid-transfer system 100 is a continuous-recirculation inkjet-printing system and the second fluid-transfer mode is the low-frequency mode, the resulting printed image may not exhibit a ripple effect during usage of the pulse-warming circuit 112. The pulse-warming circuit 112 may provide for faster fluid warming than the trickle-warming circuit 110 does. In another implementation, the warming control circuit 104 may activate both the warming circuits 112 and 110 in part 550, and not deactivate either circuit 112 or 112 in part 552.

The warming control circuit 104 continues selectively activating the pulse-warming and trickle-warming circuits 112 and 110 based on whether the current fluidic (i.e., fluid-transfer) activity of the fluidic die 102 corresponds to the first or second transfer mode in this manner, until the fluid-transfer job has been completed (554). The warming control circuit 104 responsively turns off each warming circuit 110 and/or 112 that is activated (556). The described method 540 thus may selectively use just the trickle-warming and pulse-warming circuits 110 and 112 to warm the fluid within the fluidic die 102 while the fluid-transfer job is being performed, based on which circuits 110 and/or 112 can be activated without impairing fluid-ejection quality in the case of a fluid-ejection system.

Figure 5D:
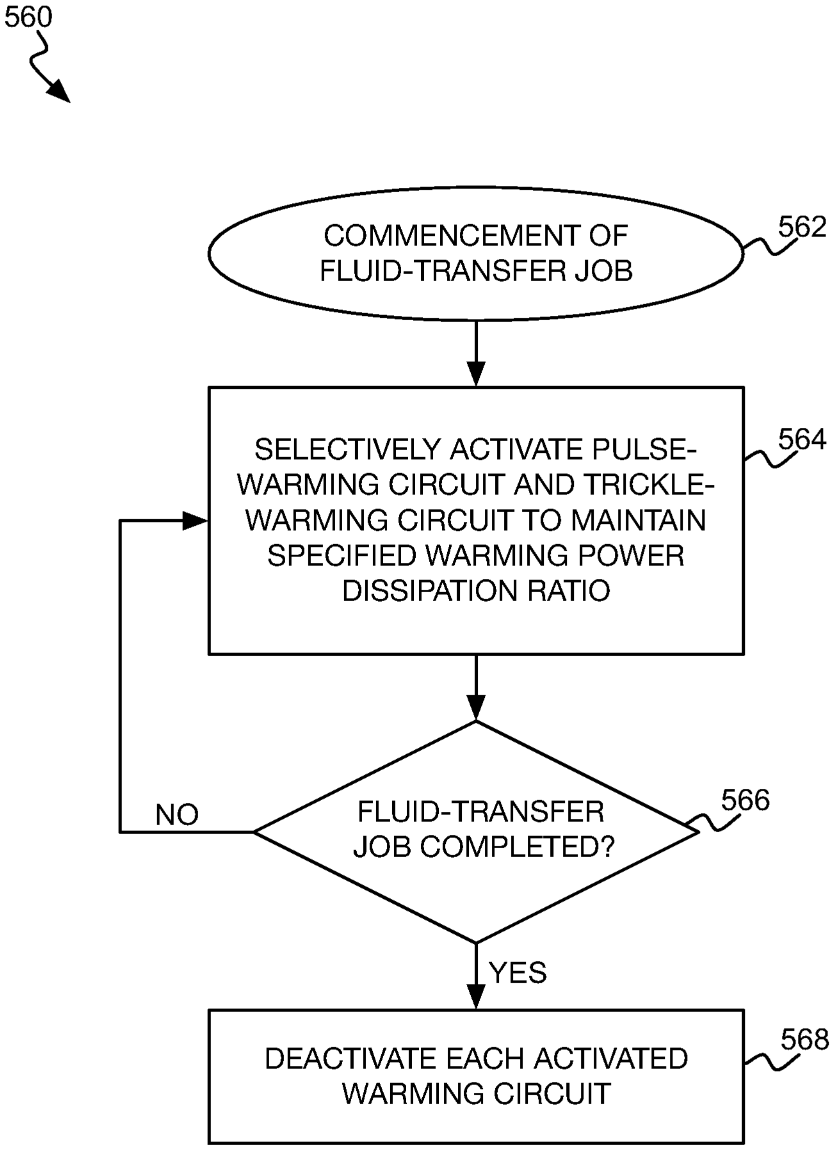

In the method 560 of FIG. 5D, at commencement of a fluid-transfer job (562), the warming control circuit 104 selectively activates the pulse-warming and trickle-warming circuits 112 and 110 to maintain a specified ratio of warming power dissipation of the trickle-warming circuit 110 to warming power dissipation of the pulse-warming circuit 112 (564). The warming power dissipation of a warming circuit 110 or 112 is the amount of power that the circuit 110 or 112 dissipates to warm the fluid within the fluidic die 102. The warming circuits 110 and 112 may be selectively activated (and deactivated) to balance the warming power dissipated by each (i.e., to maintain a one-to-one ratio).

For example, there may be a pulse-warming circuit 112 and a trickle-warming circuit 110 for each primitive of fluid-transfer elements 106. Therefore, which of the pulse-warming circuits 112 are activated (with the others deactivated or remaining deactivated) and which of the trickle-warming circuits 110 are activated (with the others deactivated or remaining activated) are selected to maintain the specified warming power dissipation ratio. Each warming circuit 112 and 110 may be hardwired to a corresponding primitive, such that activating a warming circuit 112 or 110 automatically warms fluid of that primitive. In another implementation, the primitive to which each warming circuit 112 and 110 corresponds may be dynamically controlled via registers, such that the registers are suitably set to cause a warming circuit 112 or 110 to warm fluid of a selected primitive.

The warming control circuit 104 continues selectively activating the pulse-warming and trickle-warming circuits 112 and 110 to maintain the specified warming power dissipation ratio until the fluid-transfer job has been completed (566). Which warming circuits 112 and 110 are selectively activated may change over the course of the job, depending on which fluid-transfer elements 106 are not currently transferring (e.g., ejecting) fluid and/or which elements 106 will next transfer (e.g., eject) fluid per the fluid-transfer job. Changing which warming circuits 110 and 112 are selectively activated can prevent contention of the firing elements 206 for both fluid-transfer and fluid-warming purposes, and can also warm the fluid within the fluid-transfer elements 106 so as to maximize fluid-ejection quality in the case of a fluid-ejection system. At job completion, the warming control circuit 104 deactivates each warming circuit 110 and/or 112 that is activated (568).

Figure 6:
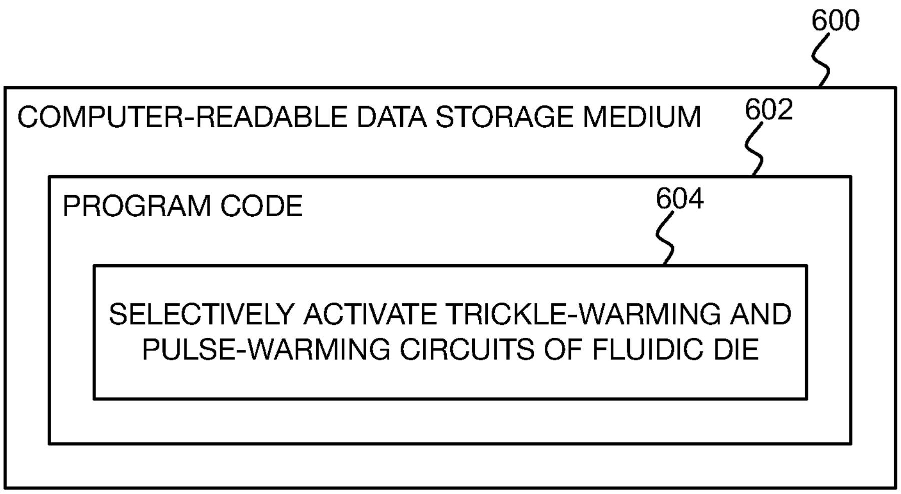
FIG. 6 is a diagram of an example non-transitory computer-readable data storage medium.

FIG. 6 shows an example non-transitory computer-readable data storage medium 600. The computer-readable data storage medium 600 stores program code 602. The program code 602 is executable by the warming control circuit 104, such as by a processor thereof, to perform processing. The processing includes selectively activating the trickle-warming and pulse-warming circuits 110 and 112 of the fluidic die 102 having the fluid-transfer elements 106 (604).

Techniques have been described for warming fluid within a fluidic die that is ejectable by fluid-ejection elements of the die, and that is more generally transferrable by fluid-transfer elements of the die. The fluidic die includes both trickle-warming and pulse-warming circuits. Q warming control circuit can selectively activate the warming circuits to maximize fluid-ejection performance and/or quality, for instance, in the case of a fluid-ejection system.

We claim:

1. A fluid-transfer system comprising:

a fluidic die comprising:

a plurality of fluid-transfer elements, each fluid-transfer element comprising a firing element that is energized to transfer fluid;

a temperature sensor to monitor a temperature on the fluidic die;

a trickle-warming circuit to warm the fluid transferrable by the fluid-transfer elements, the trickle-warming circuit comprising a warming element separate from the firing element and that is energized to warm the fluid;

a pulse-warming circuit to warm the fluid; and a warming control circuit to selectively activate the trickle-warming and pulse-warming circuits.

2. The fluid-transfer system of claim 1, wherein the warming control circuit activates the pulse-warming circuit at initiation of a fluid-transfer job, and wherein the warming control circuit activates the trickle-warming circuit at commencement of the fluid-transfer job.

3. The fluid-transfer system of claim 2, wherein the warming control circuit also activates the trickle-warming circuit at initiation of the fluid-transfer job.

4. The fluid-transfer system of claim 1, wherein the warming control circuit activates just one of the trickle-warming and pulse-warming circuits responsive to the monitored temperature being less than a first temperature threshold; and wherein the warming control circuit activates both of the trickle-warming and pulse-warming circuits responsive to the monitored temperature being less than a second temperature threshold less than the first temperature threshold.

5. The fluid-transfer system of claim 1, wherein the warming control circuit activates the trickle-warming circuit during fluid-transfer activity of the fluidic die corresponds to a first fluid-transfer mode;

and wherein the warming control circuit activates the pulse-warming circuit during the fluid-transfer activity of the fluidic die corresponds to a second fluid-transfer mode.

6. The fluid-transfer system of claim 1, wherein the warming control circuit selectively activates the trickle-warming and pulse-warming circuits to maintain a specified ratio of warming power dissipation of the trickle-warming circuit to warming power dissipation of the pulse-warming circuit.

7. The fluid-transfer system of claim 1, wherein the warming control circuit is separate from the fluidic die.

8. A fluidic die comprising:

a plurality of fluid-transfer elements, each fluid-transfer element comprising a firing element that is energized to transfer fluid;

a temperature sensor to monitor a temperature on the fluidic die;

a trickle-warming circuit to warm the fluid transferrable by the fluid-transfer elements; and a pulse-warming circuit to warm the fluid.

9. The fluidic die of claim 8, further comprising:

a warming control circuit to selectively activate the trickle-warming and pulse-warming circuits.

10. The fluidic die of claim 8, wherein the pulse-warming circuit pulsatingly energizes to warm the fluid without transferring the fluid.

11. The fluidic die of claim 8, wherein the fluid-transfer elements each comprise a firing element that is energized to transfer the fluid, that the pulse-warming circuit pulsatingly energizes to warm the fluid without transferring the fluid, and that the trickle-warming circuit energizes at a power insufficient to transfer the fluid to warm the fluid without transferring the fluid.

12. A non-transitory computer-readable data storage medium storing program code executable by a warming control circuit to perform processing comprising:

selectively activating trickle-warming and pulse-warming circuits of a fluidic die having a plurality of fluid-transfer elements, each fluid transfer element comprising a firing element that is energized to transfer the fluid, and wherein the trickle-warming circuit comprises a warming element separate from the firing element that is energized to warm the fluid.

13. The non-transitory computer-readable data storage medium of claim 12, wherein selectively activating the trickle-warming and pulse-warming circuits comprises:

activating the pulse-warming circuit at initiation of a fluid-transfer job; and activating the trickle-warming circuit at commencement of the fluid-transfer job.

14. The non-transitory computer-readable data storage medium of claim 12, wherein selectively activating the trickle-warming and pulse-warming circuits comprises:

activating just one of the trickle-warming and pulse-warming circuits responsive to a monitored temperature being less than a first temperature threshold; and activating both of the trickle-warming and pulse-warming circuits responsive to the monitored temperature being less than a second temperature threshold less than the first temperature threshold.

15. The non-transitory computer-readable data storage medium of claim 12, wherein selectively activating the trickle-warming and pulse-warming circuits comprises:

activating the trickle-warming circuit during fluid-transfer activity of the fluidic die in a first fluid-transfer mode; and activating the pulse-warming circuit during the fluid-transfer activity of the fluidic die in a second fluid-transfer mode.

* * * * *